(12) United States Patent
Chang

(10) Patent No.: US 10,895,842 B2
(45) Date of Patent: Jan. 19, 2021

(54) HOLOGRAM GENERATION APPARATUS AND METHOD THEREOF

(71) Applicant: Electronics and Telecommunications Research Institute, Daejeon (KR)

(72) Inventor: Eun Young Chang, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 204 days.

(21) Appl. No.: 16/218,252

(22) Filed: Dec. 12, 2018

(65) Prior Publication Data

US 2019/0196400 A1 Jun. 27, 2019

(30) Foreign Application Priority Data

Dec. 26, 2017 (KR) ........................ 10-2017-0180017

(51) Int. Cl.
*G06K 9/00* (2006.01)
*G03H 1/08* (2006.01)
*G03H 1/22* (2006.01)

(52) U.S. Cl.
CPC .......... *G03H 1/0808* (2013.01); *G03H 1/2202* (2013.01); *G03H 1/2294* (2013.01);
(Continued)

(58) Field of Classification Search
CPC ........... G03H 1/265; G03H 2001/2265; G03H 2001/0439; G03H 1/0808; G03H 1/2294;
(Continued)

(56) References Cited

U.S. PATENT DOCUMENTS 5,974,178 A * 10/1999 Kitayoshi ............ G01R 13/408
382/210
8,804,220 B2 8/2014 Leister et al.
(Continued)

FOREIGN PATENT DOCUMENTS

KR 1020140111782 A 9/2014
KR 1020150076526 A 7/2015

OTHER PUBLICATIONS

Matsushima et al., Extremely high-definition full-parallax computer-generated hologram created by the polygon-based method, Applied Optics, Dec. 1, 2009, vol. 48, No. 23.

*Primary Examiner* — Charlotte M Baker
(74) *Attorney, Agent, or Firm* — William Park & Associates Ltd.

(57) ABSTRACT

In the present invention, by receiving three-dimensional spatial data for a three-dimensional object, calculating a size of an elemental fringe pattern for each depth and a maximum size of the elemental fringe pattern for the three-dimensional spatial data, dividing the entire resolution of an entire predetermined hologram into a plurality of segments based on the number of divisions of the horizontal direction and the vertical direction, expanding resolution for each segment based on a maximum size for the elemental fringe pattern size, calculating a plurality of segment unit holograms for each of the segments, and accumulating overlapping regions between the plurality of segment unit holograms to produce the entire hologram for the entire resolution, it is possible to provide a hologram generating apparatus and method which may generate a hologram having a higher resolution at a faster speed than the conventional one.

20 Claims, 7 Drawing Sheets

(52) U.S. Cl.
CPC ............... *G03H 2001/0833* (2013.01); *G03H 2001/0883* (2013.01); *G03H 2210/30* (2013.01); *G03H 2226/02* (2013.01)

(58) Field of Classification Search
CPC ......... G03H 1/2202; G03H 2001/0833; G03H 2001/0883; G03H 2226/02; G03H 2210/30; G02B 5/1861; G02B 27/0172
USPC .................................... 382/154, 210, 280
See application file for complete search history.

(56) References Cited

U.S. PATENT DOCUMENTS

| | | | |
|---|---|---|---|
| 9,188,955 B2 * | 11/2015 | Wey | ................... G03H 1/0808 |
| 2014/0160541 A1 | 6/2014 | Kim et al. | |
| 2017/0148151 A1 | 5/2017 | Oh et al. | |

* cited by examiner

HOLOGRAM GENERATION APPARATUS AND METHOD THEREOF

CROSS-REFERENCE TO RELATED APPLICATION

This application claims priority to and the benefit of Korean Patent Application No. 10-2017-0180017 filed in the Korean Intellectual Property Office on Dec. 26, 2017, the entire contents of which are incorporated herein by reference.

BACKGROUND OF THE INVENTION

(a) Field of the Invention

The present invention relates to a hologram generating device and method for generating a hologram of a very high resolution at a high speed.

(b) Description of the Related Art

In recent years, as the three-dimensional image industry and the three-dimensional display industry have been activated, studies on holography technology, which is known as the ultimate 3-dimensional imaging method, have been actively conducted. Here, the holography technique refers to a technique of recording phase data of a three-dimensional object using interference between two lights (light waves), that is, a reference wave and object waves. This holography technique has the best characteristics in many aspects such as three-dimensional perception compared to the other three-dimensional imaging methods, and the user does not have visual fatigue. Computer generated hologram (CGH) technology has been developed to generate holograms using computer simulation for the interference between a reference wave and an object wave without using optical methods, thanks to the remarkable growth of digital technology and computing technology. On the other hand, a spatial light modulator (SLM) is used to reconstruct a hologram in an electronic manner.

In order to increase the viewing angle of the spatial light modulator, efforts for developing a spatial light modulator having a smaller pixel pitch than the conventional one is continuing. And, to improve the image quality of the reconstructed holographic three-dimensional image, and to increase the size of the reconstructed holographic three-dimensional image, efforts are continuing to develop spatial light modulators with higher resolution.

However, when the size of the pixel becomes smaller or the resolution becomes higher as described above, the resolution of the hologram to be reconstructed through the spatial light modulator increases, so that the calculation for generating the hologram image becomes complicated. In the process of generating the hologram image, there is a problem that the size of a required memory becomes considerably large. In order to solve this problem, a segment-based high-resolution hologram generation technique based on division has been proposed by Matsushima. According to the proposed segment-based high-resolution hologram generation technique, when generating a hologram with a resolution of 65,536*65,536, the hologram may be generated after dividing the whole resolution into 8*4 segments. The resolution for each segment is 8192*16,384, which has about 4 times the resolution of 8K UHD (7680*4320). In this case, the more subdivided the segment, the more the calculation complexity per unit segment decreases.

However, the image quality of the reconstructed holographic three-dimensional image is deteriorated due to data loss caused by independent calculation of each segment. If each segment is computed independently, blocking artifacts may occur, and the reconstructed holographic three-dimensional image may be deteriorated in detail. In order to solve the problem that arises when calculating each segment separately as described above, it is necessary to predict which polygon at a specific position representing a three-dimensional object will propagate a wave field to segments. The data loss problem is solved by reflecting wave field data to the predicted segments. For example, as shown in FIG. 1, when a certain polygon propagates a wave field to 1, 2, 9 and 10 segments as indicated by a grey quadrangle, the hologram generating unit reads the data of the first segment stored on the hard disk and stores it on the memory. After accumulating the data in the segment corresponding to the segment 1, the resultant data is stored again on the hard disk. Then, the data of the segment 2 is read from the hard disk and is stored in the memory. The data corresponding to the segment corresponding to the segment 2 is accumulated, and the resultant data is stored again on the hard disk. The same process is performed on the four segments including the 9th segment and the 10th segment.

However, when the above-described segment-based hologram generating technique is used, there is a problem that the generation speed is deteriorated due to additional processing (for example, reading and writing processing) beyond the time for actually calculating the hologram data for the corresponding polygon. According to the conventional segment-based high-resolution hologram generation technique, it takes about 45 hours to generate one mono color hologram in the actual experimental result. When the processing time for providing the occlusion effect is excluded, it takes about 26 hours. This may lead to greater problems in other applications where faster processing speed is required.

The above information disclosed in this Background section is only for enhancement of understanding of the background of the invention and therefore it may contain information that does not form the prior art that is already known in this country to a person of ordinary skill in the art.

This work was supported by 'The Cross-Ministry Giga KOREA Project' grant funded by the Korea government (MSIT) (GK17D0100, Development of Telecommunications Terminal with Digital Holographic Table-top Display).

SUMMARY OF THE INVENTION

An exemplary embodiment of the present invention provides a hologram generation apparatus and method thereof for rapidly generating a hologram, by generating a hologram considering the size of an elemental fringe pattern, in the case of using visual holographic display, and in the case of generating a hologram of ultra-high resolution.

An exemplary embodiment of the present invention provides a hologram generation method comprising: receiving three-dimensional spatial data for a three-dimensional object; calculating a size of an elemental fringe pattern for each depth and a maximum size of the elemental fringe pattern for the three-dimensional spatial data; dividing the entire resolution of an entire predetermined hologram into a plurality of segments based on the predetermined number of divisions of the horizontal direction and the vertical direction; expanding resolution for each segment based on a maximum size for the elemental fringe pattern size; calculating a plurality of segment unit holograms for each of the segments; and accumulating overlapping regions between the plurality of segment unit holograms to produce the entire hologram for the entire resolution.

Calculating the size of the elemental fringe pattern for each depth and the maximum size of the elemental fringe pattern for the three-dimensional spatial data comprises: calculating the size of the elemental fringe pattern for each depth using Equation 1, where Equation 1 is $EEP_{size}=\lambda*f*d/(p*(f-d))$, where $\lambda$ is the wavelength of a laser used for the reconstruction, f is a focal length of a field lens forming the viewing window, d is a distance between a spatial light modulator and a reconstruction position of the three-dimensional spatial data, and p is the pixel pitch of the spatial light modulator.

Calculating the size of the elemental fringe pattern for each depth and the maximum size of the elemental fringe pattern for the three-dimensional spatial data comprises calculating the size of the pixel unit of the elemental fringe pattern for each depth in the pixel unit using Equation 2, where Equation 2 is $EFP_{pixel}=EEP_{size}/p+1$.

Expanding the resolution for each segment based on the maximum size for the elemental fringe pattern size comprises expanding the resolution for each of the segments in the horizontal direction by adding a value obtained by dividing the whole resolution of the horizontal direction by a predetermined division number of the horizontal direction and a maximum size of the number of pixels of the elemental fringe pattern, and expanding the resolution for each of the segments in the vertical direction by adding a value obtained by dividing the whole resolution of the vertical direction by a predetermined division number of the vertical direction and a maximum size of the number of pixels of the elemental fringe pattern.

Expanding the resolution for each segment based on the maximum size for the elemental fringe pattern size comprises: when each of the segments exists inside the entire hologram region, expanding the resolution for each of the segments in the horizontal direction by a value obtained by dividing the whole resolution of the horizontal direction by a predetermined division number of the horizontal direction and a maximum size of the number of pixels of the elemental fringe pattern, and expanding the resolution for each of the segments in the vertical direction by a value obtained by dividing the whole resolution of the vertical direction by a predetermined division number of the vertical direction and a maximum size of the number of pixels of the elemental fringe pattern.

Expanding the resolution for each of the segments comprises: when each of the segments is at a boundary of the entire resolution region when viewed in the vertical direction, expanding the resolution for each of the segments in the horizontal direction by a value obtained by dividing the whole resolution of the horizontal direction by a predetermined division number of the horizontal direction and a half value of the maximum size of the number of pixels of the elemental fringe pattern, and expanding the resolution for each of the segments in the vertical direction by a value obtained by dividing the whole resolution of the vertical direction by a predetermined division number of the vertical direction and a maximum size of the number of pixels of the elemental fringe pattern.

Expanding the resolution for each of the segments comprises: when each of the segments is at the boundary of the entire resolution region when viewed in the horizontal direction, expanding the resolution for each of the segments in the horizontal direction by a value obtained by dividing the whole resolution of the horizontal direction by a predetermined division number of the horizontal direction and a maximum size of the number of pixels of the elemental fringe pattern, and expanding the resolution for each of the segments in the vertical direction by a value obtained by dividing the whole resolution of the vertical direction by a predetermined division number of the vertical direction and a half value of the maximum size of the number of pixels of the elemental fringe pattern.

Expanding the resolution for each of the segment comprises: when each of the segments is at the boundary of the entire resolution region when viewed in both the vertical direction and the horizontal direction, expanding the resolution for each of the segments in the horizontal direction by a value obtained by dividing the whole resolution of the horizontal direction by a predetermined division number of the horizontal direction and a half value of the maximum size of the number of pixels of the elemental fringe pattern, and expanding the resolution for each of the segments in the horizontal direction by a value obtained by dividing the whole resolution of the horizontal direction by a predetermined division number of the horizontal direction and a half value of the maximum size of the number of pixels of the elemental fringe pattern.

Generating the hologram for the entire resolution comprises: determining a segment in which three-dimensional spatial data of the three-dimensional object propagates a wave field; calculating three-dimensional space data propagating the wave field for each of the segments; calculating segment unit holograms for each of the segments using a computer-generated hologram generation technique based on three-dimensional spatial data propagating the wave field for each of the segments; and accumulating the overlapping regions between the segments and summing the segment unit holograms to produce the entire hologram for the entire resolution.

Determining the segment to which the three-dimensional spatial data of the three-dimensional object propagates the wave field comprises dividing the three-dimensional spatial data based on the predetermined number of divisions of the horizontal direction and the vertical direction, and applying a value of zero to the expanded region of each segment.

The three-dimensional spatial data includes at least one point light source data, and determining the segment to which the three-dimensional spatial data of the three-dimensional object propagates the wave field comprises: determining a segment corresponding to a wave field generated from the point light source data for each of the point light source data, and determining the three-dimensional spatial data for each of the segments based on the prior determination result.

Expanding the resolution for each of the segments comprises: expanding a first resolution for the first segment based on a first reconstruction depth of the first three-dimensional spatial data propagating the wave field to the first segment, and expanding a second resolution for the second segment based on a second reconstruction depth of the second three-dimensional spatial data propagating the wave field to the second segment.

An exemplary embodiment of the present invention provides a hologram generation apparatus, comprising: a three-dimensional spatial data input unit configured to receive three-dimensional spatial data of a three-dimensional object; a hologram elemental fringe pattern size calculating unit configured to calculate a maximum size of an elemental fringe pattern and a size of the elemental fringe pattern for each depth for the three-dimensional spatial data; a hologram plane dividing unit configured to divide entire resolution of a predetermined entire hologram into a plurality of segments based on a predetermined number of divisions for the horizontal direction and a vertical direction and expand resolution for each segment based on the maximum size of the elemental fringe pattern; and a hologram generating unit configured to calculate a plurality of segment unit holograms for each of the segments, accumulate overlapping regions between the plurality of segment unit holograms, and generate the entire hologram for the entire resolution.

The hologram elemental fringe pattern size calculating unit calculates the size of the elemental fringe pattern for each depth using Equation 1, where Equation 1 is $EEP_{size}=\lambda*f*d/(p*(f-d))$, where $\lambda$ is the wavelength of a laser used for the reconstruction, f is a focal length of a field lens forming a viewing window, d is a distance between a spatial light modulator and a reconstruction position of three-dimensional spatial data, and p is pixel pitch of the spatial light modulator.

The hologram elemental fringe pattern size calculating unit calculates the size of the pixel unit of the elemental fringe pattern in pixel unit for each depth using Equation 2, where Equation 2 is $EFP_{pixel}=EEP_{size}/p+1$.

The hologram plane dividing unit expands the resolution for each of the segments in the horizontal direction by adding a value obtained by dividing the whole resolution of the horizontal direction by a predetermined division number of the horizontal direction and a maximum size of the number of pixels of the elemental fringe pattern, and expands the resolution for each of the segments in the vertical direction by adding a value obtained by dividing the whole resolution of the vertical direction by a predetermined division number of the vertical direction and a maximum size of the number of pixels of the elemental fringe pattern.

When each of the segments exists inside the entire hologram region, the hologram plane dividing unit expands the resolution for each of the segments in the horizontal direction by a value obtained by dividing the whole resolution of the horizontal direction by a predetermined division number of the horizontal direction and a maximum size of the number of pixels of the elemental fringe pattern, and expands the resolution for each of the segments in the vertical direction by a value obtained by dividing the whole resolution of the vertical direction by a predetermined division number of the vertical direction and a maximum size of the number of pixels of the elemental fringe pattern.

When each of the segments is at the boundary of the entire resolution region when viewed in the vertical direction, the hologram plane dividing unit expands the resolution for each of the segments in the horizontal direction by a value obtained by dividing the whole resolution of the horizontal direction by a predetermined division number of the horizontal direction and a half value of the maximum size of the number of pixels of the elemental fringe pattern, and expands the resolution for each of the segments in the vertical direction by a value obtained by dividing the whole resolution of the vertical direction by a predetermined division number of the vertical direction and a maximum size of the number of pixels of the elemental fringe pattern.

When each of the segments is at the boundary of the entire resolution region when viewed in the horizontal direction, the hologram plane dividing unit expands the resolution for each of the segments in the horizontal direction by a value obtained by dividing the whole resolution of the horizontal direction by a predetermined division number of the horizontal direction and a maximum size of the number of pixels of the elemental fringe pattern, and expands the resolution for each of the segments in the vertical direction by a value obtained by dividing the whole resolution of the vertical direction by a predetermined division number of the vertical direction and a half value of the maximum size of the number of pixels of the elemental fringe pattern.

An exemplary embodiment of the present invention provides a hologram generation apparatus, comprising: a three-dimensional spatial data input unit configured to receive three-dimensional spatial data of a three-dimensional object; a hologram elemental fringe pattern size calculating unit configured to calculate a maximum size of the elemental fringe pattern and a size of the elemental fringe pattern for each depth for the three-dimensional spatial data; a hologram plane dividing unit configured to divide entire resolution of a predetermined entire hologram into a plurality of segments based on a predetermined number of divisions of the horizontal direction and a vertical direction and expand resolution for each segment based on a maximum size of the elemental fringe pattern; and a hologram generating unit configured to determine a segment in which the three-dimensional spatial data of the three-dimensional object propagates a wave field, calculate three-dimensional space data propagating the wave field for each of the segments, calculate the segment unit holograms for each of the segments using a computer-generated hologram generation technique based on three-dimensional spatial data propagating the wave field for each of the segments, and accumulate the overlapping regions between the segments and sum the segment unit holograms to produce the entire hologram for the entire resolution.

DETAILED DESCRIPTION OF THE EMBODIMENTS

Figure 1:
FIG. 1 shows a generation process of a segmentation-based ultra-high resolution hologram based on division according to a conventional art.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Hereinafter, referring to FIG. 2 to FIG. 7, a hologram generating device according to an exemplary embodiment of the present invention, and a hologram generating method using the hologram generating device, will be described in detail.

Figure 2:
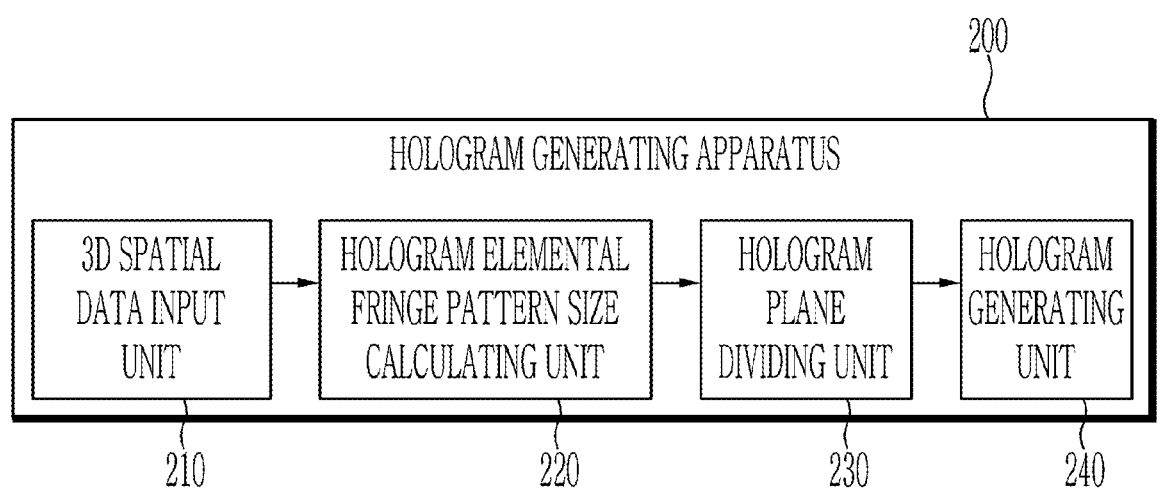
FIG. 2 shows a hologram generation apparatus according to an exemplary embodiment of the present invention.

FIG. 2 shows a hologram generation apparatus according to an exemplary embodiment of the present invention.

As shown in FIG. 2, the hologram generating apparatus 200 may include a three-dimensional spatial data input unit 210, hologram elemental fringe pattern size calculating unit 220, a hologram plane dividing unit 230, and a hologram generating unit 240.

The three-dimensional spatial data input unit 210 may receive three-dimensional spatial data of a three-dimensional object to be reconstructed.

For example, the three-dimensional object may be an object reconstructed as a holographic three-dimensional image. For example, the three-dimensional object may include, but is not necessarily limited to, humans, objects, and/or scenes.

The hologram generating apparatus 200 may generate the entire hologram corresponding to the three-dimensional spatial data using a computer-generated hologram (CGH) generation technique. For example, the hologram generating apparatus 200 may generate an entire hologram by computer-generated hologram generation techniques using color data (R, G, B) and three-dimensional geometry data (X, Y, Z)

Accordingly, the 3D spatial data of a 3D object according to an exemplary embodiment of the present invention may include color data and depth data of a 3D object as data constituting a 3D object. For example, the depth data may contain data quantized to 256 levels (8-bit data).

The hologram elemental fringe pattern size calculating unit 220 receives the depth data from the three-dimensional spatial data input unit 210, and may calculate the elemental fringe pattern size for each depth and the maximum size for the elemental fringe pattern with respect to the depth data. For example, a fringe pattern is one of forms for expressing the entire hologram, and is a region containing the information of the object of the entire hologram using interference of the light reflected from the surface of the object, and the elemental fringe pattern is a minimum region for representing a hologram for each depth. For example, if the pixel size of the spatial light modulator for generating the entire hologram is p, the wavelength of the laser used for reconstruction is λ, the focal length of the field lens forming the viewing window is f, and the depth distance between the spatial light modulator and the reconstruction position of the corresponding three-dimensional spatial data is d, the hologram elemental fringe pattern size calculating unit 220 calculates the physical size ($EEP_{size}$) of the elemental fringe pattern with respect to the specific reconstruction depth d using Equation 1.

$$EEP_{size} = \lambda * f * d / (p * (f-d))$$ [Equation 1]

Further, the hologram elemental fringe pattern size calculating unit 220 may convert the physical size of the elemental fringe pattern into the number of pixels ($EEP_{pixel}$) in the pixel unit by using Equation 2 below.

$$EFP_{pixel} = EEP_{size}/p + 1$$ [Equation 2]

That is, as may be seen from Equation 1 and Equation 2, the hologram elemental fringe pattern size calculating unit 220 may determine the size of the elemental fringe pattern differently based on the reconstruction depth d.

When the entire hologram is generated to have a larger resolution than the elemental fringe pattern calculated according to the reconstruction depth d of each point constituting the three-dimensional spatial data, since the hologram part of the area exceeding the elemental fringe pattern is not recognized by the human visual system during the reconstruction process, unnecessary calculation is performed. On the contrary, if holograms are generated so as to have a smaller resolution than the elemental fringe pattern calculated according to the reconstruction depth d of each point constituting the three-dimensional spatial data, data loss occurs in the hologram generation process, and it may result in quality of a reconstructed holographic image. Therefore, when generating the entire hologram using three-dimensional spatial data, it is necessary to calculate the elemental fringe pattern size based on the reconstruction depth d, so that a hologram that is efficient in terms of calculation complexity can be generated.

The hologram plane dividing unit 230 may divide the entire hologram to be generated as a plurality of segments. For example, the hologram plane dividing unit 230 may divide the whole resolution of the entire hologram into segment units based on the predetermined number of divisions of the horizontal direction and vertical direction. The hologram plane dividing unit 230 expands the resolution of each of the divided segments based on the size of the elemental fringe pattern ($EEP_{size}$) calculated by the hologram elemental fringe pattern size calculating unit 220 or the size ($EFP_{pixel}$) of the elemental fringe pattern representing the number of pixels in the pixel unit.

The hologram generating unit 240 may include a segment unit three-dimensional spatial data determining unit, a segment unit hologram generating unit, and/or a segment unit hologram integrating unit.

For example, the three-dimensional spatial data determining unit of a segment unit may determine to which segment of the plurality of segments the three-dimensional spatial data of the three-dimensional object propagates the wave field, and may calculate the three-dimensional spatial data that propagates the wave field for each segment based on the determined segment.

For example, the segment unit hologram generating unit may calculate a segment unit hologram for each segment by using a computer-generated hologram generation technique based on segment-based three-dimensional spatial data calculated through a segment unit three-dimensional spatial data determining unit.

For example, segment unit hologram integrating unit may generate an entire hologram by integrating segment unit holograms. For example, the segment unit hologram integrator unit adds the segment unit holograms, and the segment unit holograms are summed so that the segment portions of the overlapping regions overlapping each other are summed (or overlapped), and thereby generates an entire hologram for the entire resolution.

Figure 3:
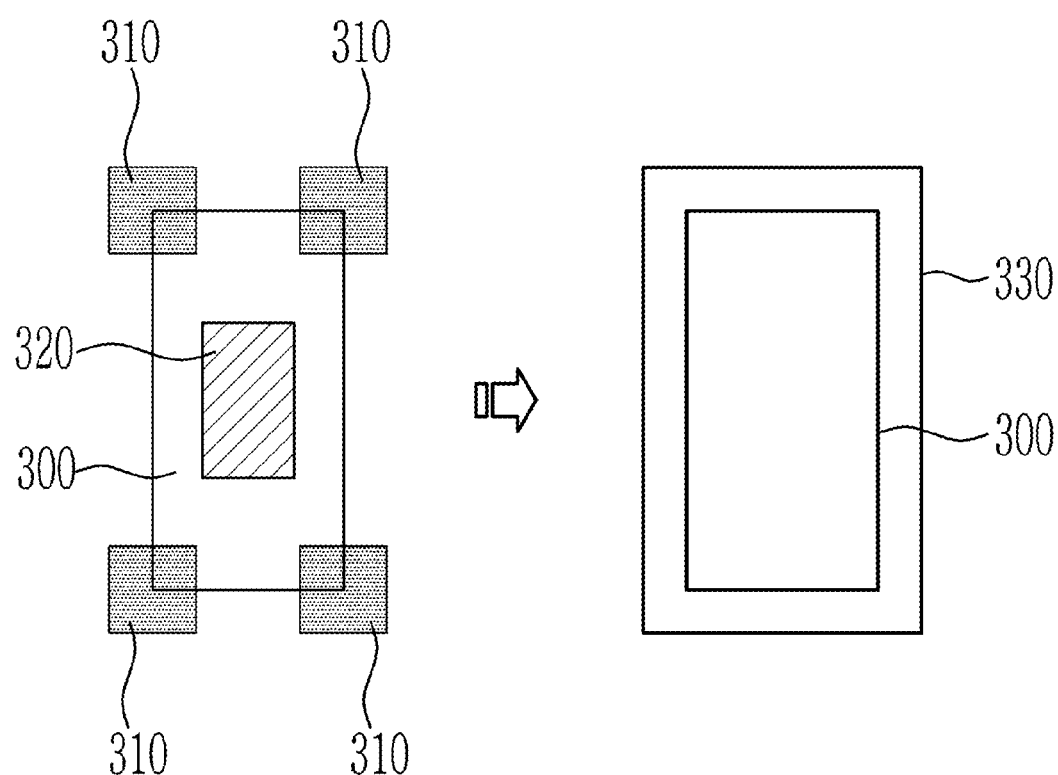
FIG. 3 shows a process for determining the resolution of a segment according to an exemplary embodiment of the present invention.

FIG. 3 shows a process for determining the resolution of a segment according to an exemplary embodiment of the present invention.

As shown in FIG. 3, the hologram plane dividing unit 230 determines the resolution for each of the segments based on the number of the predetermined horizontal direction divisions and the predetermined vertical direction divisions to divide the entire resolution of the entire hologram, and expands the resolution for each segment based on the calculated elemental fringe pattern size.

For example, if the resolution of the entire hologram is Mx*Ny, the number of divisions of the horizontal direction is P and the number of divisions of the vertical direction is Q, each divided segment may have a resolution of Mx/P in the horizontal direction and a resolution of Ny/Q in the vertical direction.

As shown in FIG. 3, for example, a propagation position 320 corresponding to the elemental fringe pattern may be present within a segment 300. In this case, it is only necessary to consider the elemental fringe pattern for the corresponding three-dimensional spatial data within the resolution of Mx/P*Ny/Q.

However, it may be seen that a position 310 where the propagated wave field of the fringe pattern is expanded to the outside of the segment, and that four positions 310 the propagation spaces existing in the outermost propagation regions.

At this time, the hologram generating apparatus expand the region of the segment 300 as shown in the right side of FIG. 3, then the hologram generating apparatus may expand the area of the segment 300 to the segment area 330 and independently process the three-dimensional spatial data that propagates the wave field in the region of the corresponding segment 330 without considering a region of another segment. That is, as described with reference with FIG. 1, no additional processing such as reading and writing is required for the region of four segments, and an entire hologram may be generated without data loss.

In this case, when the maximum size value in the EFP pixel representing the number of pixels of the elemental fringe pattern in the pixel unit is $EFP\_MAX_{pixel}$, the hologram generating unit expands the segment to the size of $[EFP\_MAX_{pixel}/2]$ in the upper/lower/left/right directions. Finally, the hologram generating unit expands the resolution of each segment determined based on the number of divisions in the horizontal and vertical directions and the maximum elemental fringe pattern size by $M_x/P+[EFP\_MAX_{pixel}/2]*2$ in the horizontal direction, and may be expanded to $N_y/Q+[EFP\_MAX_{pixel}/2]*2$ in the vertical direction.

Expanding the resolution of this segment increases the resolution of the unit segment to be processed, but it does not require additional processing such as reading and writing, which may improve the speed.

Figure 4:
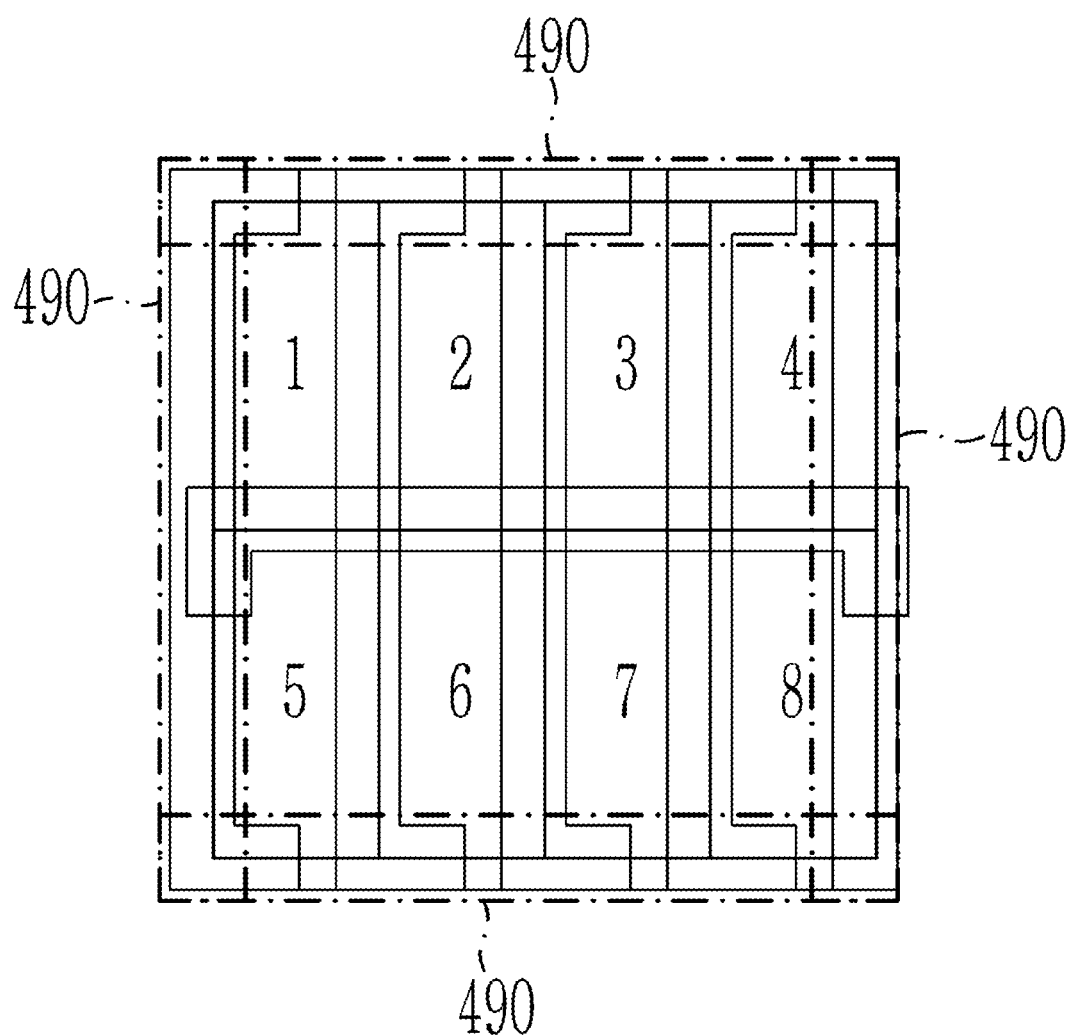
FIG. 4 show a process of generating a very high resolution hologram based on the resolution of a segment according to an exemplary embodiment of the present invention.

FIG. 4 show a process of generating a very high resolution hologram based on the resolution of a segment according to an exemplary embodiment of the present invention.

As shown in FIG. 4, the hologram generating unit may divide the resolution of the entire hologram into 4*2 segments and expand the region of each segment based on the maximum elemental fringe pattern size. When generating a segment unit hologram for each segment, the hologram generating apparatus may independently calculate each segment.

Figure 5:
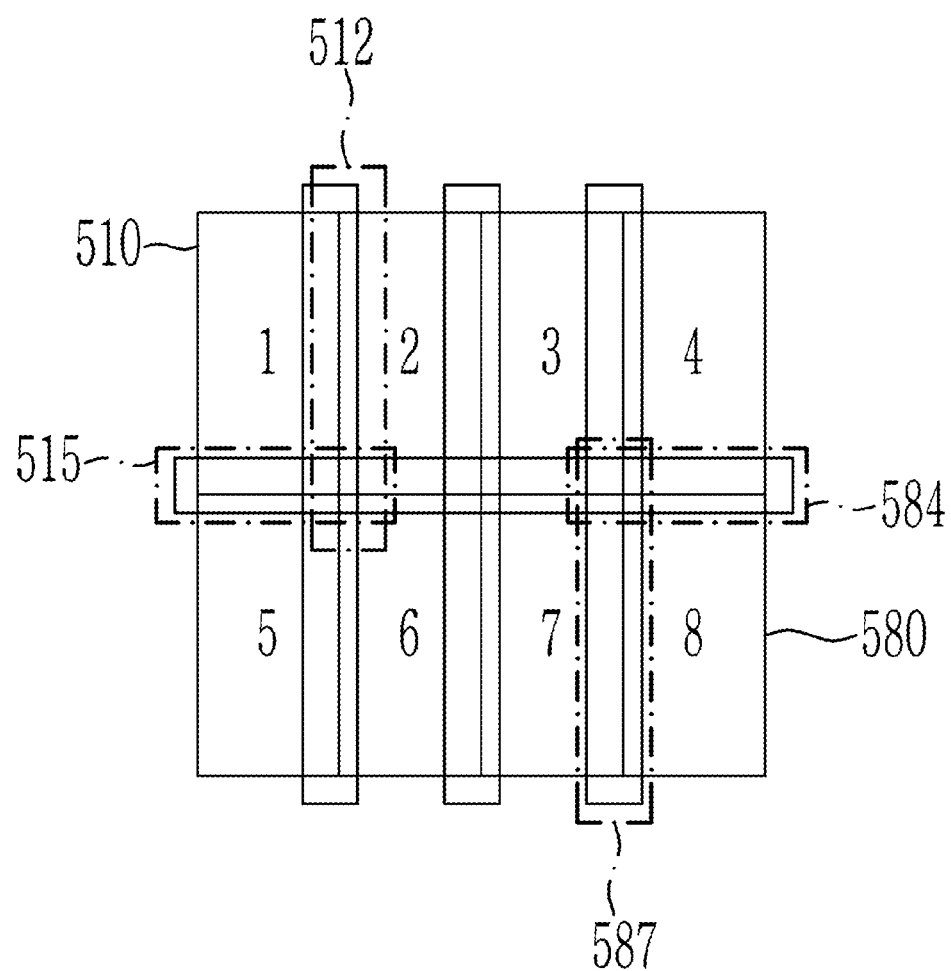
FIG. 5 shows the process of generating a very high resolution hologram based on the resolution of a segment according to another exemplary embodiment of the present invention.

FIG. 5 shows the process of generating a very high resolution hologram based on the resolution of a segment according to another exemplary embodiment of the present invention.

As shown in FIG. 5, the hologram generating apparatus may divide the entire hologram resolution into 4*2 segments, expand the area of each segment based on the maximum size of the elemental fringe pattern, and generate the segment unit hologram using the expanded segments. However, different from the description with reference with FIG. 4, when an expanded segment is also present in the entire resolution of the entire hologram, the hologram generating device excludes an area that is not related to the resolution of the entire hologram (e.g., an outer region 490 of FIG. 4), and calculates the entire hologram on the effective area inside the hologram area.

For example, for a first segment 510, the hologram generating device may generate a segment unit hologram based on only an expanded right region 512 and an expanded lower region 515, excluding the expanded left region and the expanded upper region of the first segment.

For example, with respect to an 8th segment 580, the hologram generating device may generate a segment unit hologram based on only an expanded left region 587 and an expanded upper region 584, excluding the expanded right region and the expanded lower region of the 8th segment.

This method has a merit that it may slightly reduce the computational complexity when compared with the method by FIG. 4. Also, the method of FIG. 5 includes that the hologram generating apparatus may generate a segment unit hologram for each segment.

Figure 6:
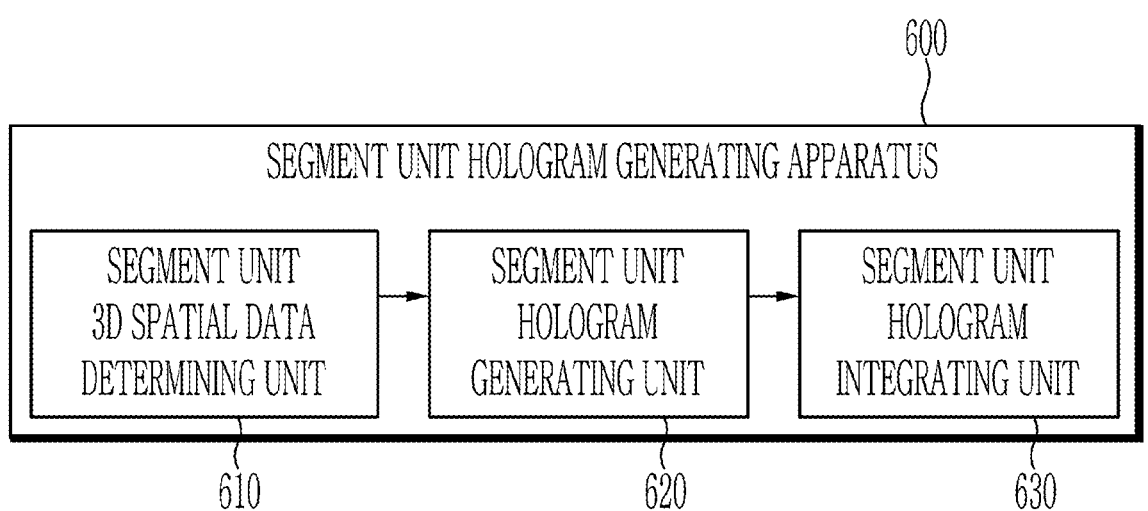
FIG. 6 shows a flowchart illustrating a method of generating a hologram based on a segment according to another exemplary embodiment of the present invention.

FIG. 6 shows a flowchart illustrating a method of generating a hologram based on a segment according to another exemplary embodiment of the present invention.

A segment unit hologram generating apparatus 600 may include a segment unit three-dimensional spatial data determining unit 610, a segment unit hologram generating unit 620, and a segment unit hologram integrating unit 630.

For example, the segment unit three-dimensional spatial data determining unit 610 may determine that which three-dimensional spatial data propagates the wave field to which segment for each of the three-dimensional spatial data of the three-dimensional object is propagated to generate the entire hologram for the entire resolution, and calculate three-dimensional spatial data for propagating the wave field by each segment.

For example, the segment unit hologram generating unit 620 may calculate the segment unit holograms for each segment based on the computer-generated hologram generation technique based on the segment unit three-dimensional spatial data calculated through the segment unit three-dimensional spatial data determining unit 610.

For example, the segment unit hologram integrating unit 630 sums the segment unit holograms calculated for each segment, and accumulates the overlapping segment unit holograms generated for each segment, and generates an entire hologram for the entire resolution.

As an example, the three-dimensional spatial data may have a resolution of Mx*Ny that is equal to the entire resolution of the entire hologram. When the maximum size value of the $EFP_{pixel}$ indicating the number of pixels of the pixel unit of the elemental fringe pattern in the pixel unit is $EFP\_MAX_{pixel}$, the segment unit three-dimensional spatial data determining unit 610 expands the three-dimensional spatial data in the upper/lower/left/right directions by the size of $[EFP\_MAX_{pixel}/2]$, the same as the entire hologram. The segment unit three-dimensional spatial data determining unit 610 may perform zero padding by applying '0' values to the expanded upper/lower/left/right regions. The segment unit three-dimensional spatial data determining unit 610 may perform the above-described data processing for all the segments. The segment unit hologram generating unit 620 may quantize the received three-dimensional spatial data at the depth level and generate the segment unit hologram by depth level using Fourier transform for the three-dimensional spatial data according to each depth, and accumulate the segment unit holograms of all depth levels, so that segment unit holograms may be generated for each segment. The segment unit hologram integrating unit 630 may sum all the segment unit holograms based on the region of the segment before expansion. The segment unit hologram integrating unit 630 may generate the entire hologram for the entire resolution by cumulatively reflecting the values of the segment unit holograms for the region where the segment unit holograms overlap each other.

As another example, the segment unit three-dimensional spatial data determining unit 610 may determine the three-dimensional spatial data corresponding to each segment based on the wave field generated when the point light source is propagated. The segment unit three-dimensional spatial data determining unit 610 may determine the segment corresponding to each point light source for all point light sources, and may determine three-dimensional spatial data for each segment. The segment unit hologram generating unit 620 may cumulatively add holograms for all three-dimensional spatial data for each segment to generate holograms of the segment unit. The segment unit hologram integrating unit 630 accumulates the segment unit holograms generated for each segment based on the hologram region of the segment unit before expansion and cumulatively reflects the value of each segment unit hologram for the overlapping region, and generates the entire hologram for the entire resolution.

On the other hand, in the above description, the region of each segment is expanded to the same size as the maximum size of the elemental fringe pattern for all the segments. However, alternatively, based on the reconstruction depth of the three-dimensional spatial data propagating the wave field for each segment, the different sizes of the different maximum elemental fringe patterns can be calculated and used for expanding each segment region differently.

For example, the reconstruction depth d of the three-dimensional spatial data propagating the wave field may be different for each segment. For example, the reconstruction depth of the first three-dimensional spatial data propagating the wave field in the first segment has a first distance, while the reconstruction depth of the second three-dimensional spatial data propagating the wave field in the second segment has a second distance.

Accordingly, the hologram generating apparatus may expand the region of the first segment by the third size and expand the region of the second segment by the fourth size.

Figure 7:
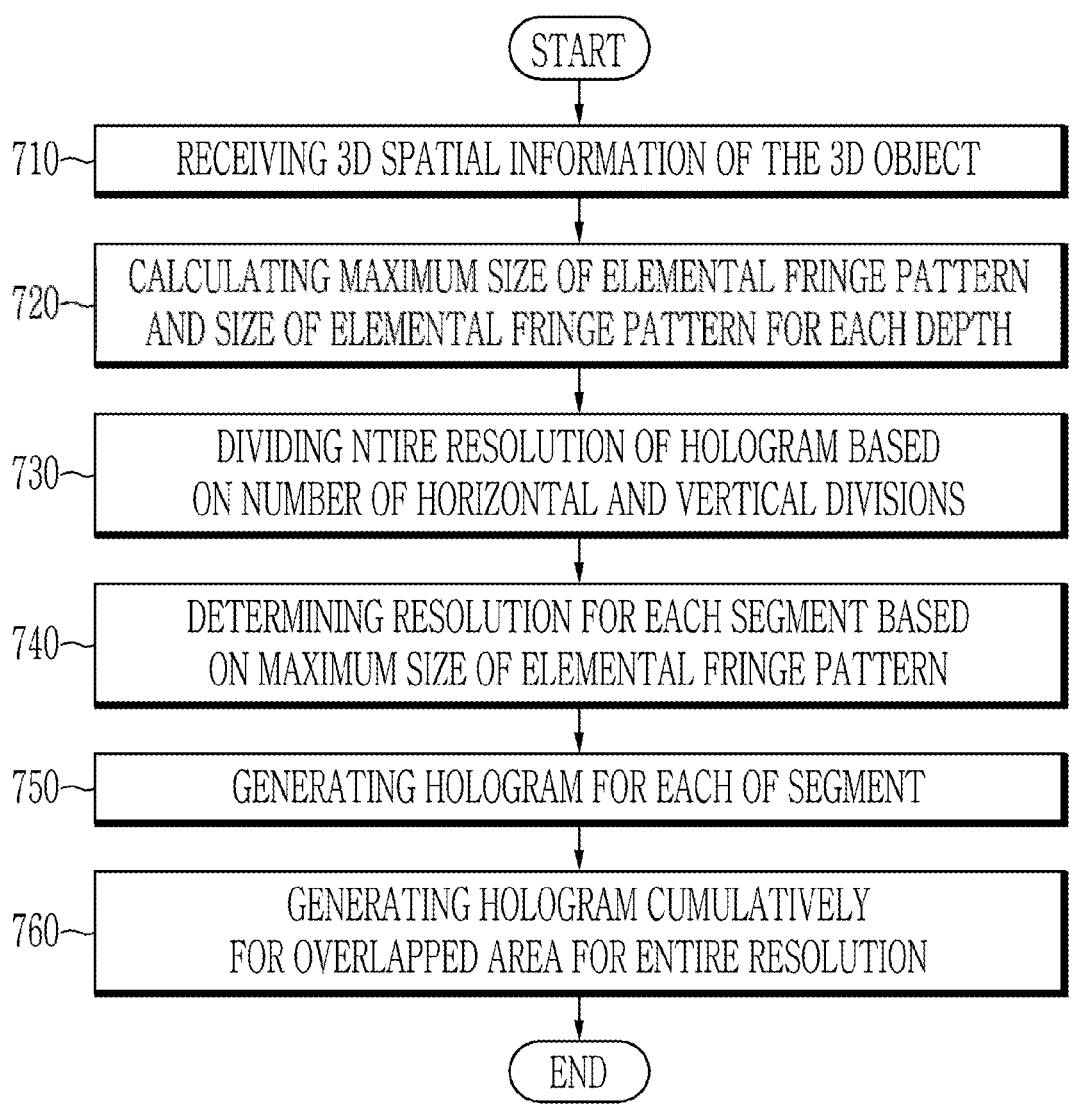
FIG. 7 shows a flowchart illustrating a method of generating a segment-based super-high resolution hologram by division according to another exemplary embodiment of the present invention.

FIG. 7 shows a flowchart illustrating a method of generating a segment-based super-high resolution hologram by division according to another exemplary embodiment of the present invention.

In step 710, the hologram generating apparatus may receive three-dimensional spatial data of a three-dimensional object to be reconstructed.

In step 720, the hologram generating device may calculate the size of the initial fringe pattern for each depth and the maximum size of the initial fringe pattern for the 3-dimensional depth data of the three-dimensional spatial data received in step 710.

In step 730, the hologram generating device may divide the entire resolution of the entire hologram into segments based on the predetermined number of divisions of the horizontal direction and the predetermined number of divisions of vertical direction.

In step 740, the hologram generating device may expand the resolution for each divided segment, taking into account the calculated maximum elemental fringe pattern size.

In step 750, the hologram generating device may generate segment unit holograms for each segment.

In step 760, the hologram generating device may accumulate and sum up the regions overlapping the calculated holograms of the segment unit to generate the entire hologram.

While this invention has been described in connection with what is presently considered to be an exemplary embodiment, it is to be understood that the invention is not limited to the disclosed embodiments, but, included within the spirit and scope of the appended claims.

Through a method and apparatus for generating a hologram according to an embodiment of the present invention, a higher resolution hologram may be generated at a higher speed than in the conventional art by generating a hologram in consideration of the size of the elemental fringe pattern for the three-dimensional object when calculating a hologram to be reconstructed by an ultra-high resolution spatial light modulator SLM in order to reconstruct a holographic three-dimensional image.

What is claimed is:

1. A hologram generation method, comprising:
receiving three-dimensional spatial data for a three-dimensional object;
calculating a size of an elemental fringe pattern for each depth and a maximum size of the elemental fringe pattern for the three-dimensional spatial data;
dividing the entire resolution of an entire predetermined hologram into a plurality of segments based on the predetermined number of divisions of the horizontal direction and the vertical direction;
expanding resolution for each segment based on a maximum size for the elemental fringe pattern size;
calculating a plurality of segment unit holograms for each of the segments; and
accumulating overlapping regions between the plurality of segment unit holograms to produce the entire hologram for the entire resolution.

2. The method of claim 1, wherein calculating the size of the elemental fringe pattern for each depth and the maximum size of the elemental fringe pattern for the three-dimensional spatial data comprises:
calculating the size of the elemental fringe pattern for each depth using Equation 1 below:

$$EEP_{size}=\lambda*f*d/(p*(f-d))  \quad\quad [\text{Equation 1}]$$

(where $\lambda$ is the wavelength of a laser used for the reconstruction, f is a focal length of a field lens forming the viewing window, d is a distance between a spatial light modulator and a reconstruction position of the three-dimensional spatial data, and p is the pixel pitch of the spatial light modulator).

3. The method of claim 2, wherein calculating the size of the elemental fringe pattern for each depth and the maximum size of the elemental fringe pattern for the three-dimensional spatial data comprises:
calculating the size of the pixel unit of the elemental fringe pattern for each depth in the pixel unit using Equation 2 below:

$$EFP_{pixel}=EEP_{size}/p+1. \quad\quad [\text{Equation 2}]$$

4. The method of claim 1, wherein expanding the resolution for each segment based on the maximum size for the elemental fringe pattern size comprises:
expanding the resolution for each of the segments in the horizontal direction by adding a value obtained by dividing the whole resolution of the horizontal direction by a predetermined division number of the horizontal direction and a maximum size of the number of pixels of the elemental fringe pattern, and expanding the resolution for each of the segments in the vertical direction by adding a value obtained by dividing the whole resolution of the vertical direction by a predetermined division number of the vertical direction and a maximum size of the number of pixels of the elemental fringe pattern.

5. The method of claim 1, wherein expanding the resolution for each segment based on the maximum size for the elemental fringe pattern size comprises:

when each of the segments exists inside the entire hologram region, expanding the resolution for each of the segments in the horizontal direction by a value obtained by dividing the whole resolution of the horizontal direction by a predetermined division number of the horizontal direction and a maximum size of the number of pixels of the elemental fringe pattern, and expanding the resolution for each of the segments in the vertical direction by a value obtained by dividing the whole resolution of the vertical direction by a predetermined division number of the vertical direction and a maximum size of the number of pixels of the elemental fringe pattern.

6. The method of claim 1, wherein expanding the resolution for each of the segments comprises:

when each of the segments is at a boundary of the entire resolution region when viewed in the vertical direction, expanding the resolution for each of the segments in the horizontal direction by a value obtained by dividing the whole resolution of the horizontal direction by a predetermined division number of the horizontal direction and a half value of the maximum size of the number of pixels of the elemental fringe pattern, and expanding the resolution for each of the segments in the vertical direction by a value obtained by dividing the whole resolution of the vertical direction by a predetermined division number of the vertical direction and a maximum size of the number of pixels of the elemental fringe pattern.

7. The method of claim 1, wherein expanding the resolution for each of the segments comprises:

when each of the segments is at the boundary of the entire resolution region when viewed in the horizontal direction, expanding the resolution for each of the segments in the horizontal direction by a value obtained by dividing the whole resolution of the horizontal direction by a predetermined division number of the horizontal direction and a maximum size of the number of pixels of the elemental fringe pattern, and expanding the resolution for each of the segments in the vertical direction by a value obtained by dividing the whole resolution of the vertical direction by a predetermined division number of the vertical direction and a half value of the maximum size of the number of pixels of the elemental fringe pattern.

8. The method of claim 1, wherein expanding the resolution for each of the segment comprises:

when each of the segments is at the boundary of the entire resolution region when viewed in both the vertical direction and the horizontal direction, expanding the resolution for each of the segments in the horizontal direction by a value obtained by dividing the whole resolution of the horizontal direction by a predetermined division number of the horizontal direction and a half value of the maximum size of the number of pixels of the elemental fringe pattern, and expanding the resolution for each of the segments in the horizontal direction by a value obtained by dividing the whole resolution of the horizontal direction by a predetermined division number of the horizontal direction and a half value of the maximum size of the number of pixels of the elemental fringe pattern.

9. The method of claim 1, wherein generating the hologram for the entire resolution comprises:

determining a segment in which three-dimensional spatial data of the three-dimensional object propagates a wave field;

calculating three-dimensional space data propagating the wave field for each of the segments;

calculating segment unit holograms for each of the segments using a computer-generated hologram generation technique based on three-dimensional spatial data propagating the wave field for each of the segments; and accumulating the overlapping regions between the segments and summing the segment unit holograms to produce the entire hologram for the entire resolution.

10. The method of claim 9, wherein determining the segment to which the three-dimensional spatial data of the three-dimensional object propagates the wave field comprises dividing the three-dimensional spatial data based on the predetermined number of divisions of the horizontal direction and the vertical direction, and applying a value of zero to the expanded region of each segment.

11. The method of claim 9, wherein the three-dimensional spatial data includes at least one point light source data, and determining the segment to which the three-dimensional spatial data of the three-dimensional object propagates the wave field comprises:

determining a segment corresponding to a wave field generated from the point light source data for each of the point light source data, and determining the three-dimensional spatial data for each of the segments based on the prior determination result.

12. The method of claim 9, wherein expanding the resolution for each of the segments comprises:

expanding a first resolution for the first segment based on a first reconstruction depth of the first three-dimensional spatial data propagating the wave field to the first segment, and expanding a second resolution for the second segment based on a second reconstruction depth of the second three-dimensional spatial data propagating the wave field to the second segment.

13. A hologram generation apparatus, comprising:

a three-dimensional spatial data input unit configured to receive three-dimensional spatial data of a three-dimensional object;

a hologram elemental fringe pattern size calculating unit configured to calculate a maximum size of an elemental fringe pattern and a size of the elemental fringe pattern for each depth for the three-dimensional spatial data;

a hologram plane dividing unit configured to divide entire resolution of a predetermined entire hologram into a plurality of segments based on a predetermined number of divisions for the horizontal direction and a vertical direction and expand resolution for each segment based on the maximum size of the elemental fringe pattern; and a hologram generating unit configured to calculate a plurality of segment unit holograms for each of the segments, accumulate overlapping regions between the plurality of segment unit holograms, and generate the entire hologram for the entire resolution.

14. The apparatus of claim 13, wherein the hologram elemental fringe pattern size calculating unit calculates the size of the elemental fringe pattern for each depth using Equation 1 below:

$$EEP_{size} = \lambda * f * d / (P * (f-d))$$ [Equation 1]

(where $\lambda$ is the wavelength of a laser used for the reconstruction, f is a focal length of a field lens forming a viewing window, d is a distance between a spatial light modulator and a reconstruction position of three-dimensional spatial data, and p is pixel pitch of the spatial light modulator).

15. The apparatus of claim 14, wherein the hologram elemental fringe pattern size calculating unit calculates the size of the pixel unit of the elemental fringe pattern in pixel unit for each depth using Equation 2 below:

$$EFP_{pixel} = EEP_{size}/p + 1.$$ [Equation 2]

16. The apparatus of claim 13, wherein the hologram plane dividing unit:
expands the resolution for each of the segments in the horizontal direction by adding a value obtained by dividing the whole resolution of the horizontal direction by a predetermined division number of the horizontal direction and a maximum size of the number of pixels of the elemental fringe pattern, and
expands the resolution for each of the segments in the vertical direction by adding a value obtained by dividing the whole resolution of the vertical direction by a predetermined division number of the vertical direction and a maximum size of the number of pixels of the elemental fringe pattern.

17. The apparatus of claim 13, wherein when each of the segments exists inside the entire hologram region, the hologram plane dividing unit:
expands the resolution for each of the segments in the horizontal direction by a value obtained by dividing the whole resolution of the horizontal direction by a predetermined division number of the horizontal direction and a maximum size of the number of pixels of the elemental fringe pattern, and
expands the resolution for each of the segments in the vertical direction by a value obtained by dividing the whole resolution of the vertical direction by a predetermined division number of the vertical direction and a maximum size of the number of pixels of the elemental fringe pattern.

18. The apparatus of claim 13, wherein when each of the segments is at the boundary of the entire resolution region when viewed in the vertical direction, the hologram plane dividing unit:
expands the resolution for each of the segments in the horizontal direction by a value obtained by dividing the whole resolution of the horizontal direction by a predetermined division number of the horizontal direction and a half value of the maximum size of the number of pixels of the elemental fringe pattern, and
expands the resolution for each of the segments in the vertical direction by a value obtained by dividing the whole resolution of the vertical direction by a predetermined division number of the vertical direction and a maximum size of the number of pixels of the elemental fringe pattern.

19. The apparatus of claim 13, wherein when each of the segments is at the boundary of the entire resolution region when viewed in the horizontal direction, the hologram plane dividing unit:
expands the resolution for each of the segments in the horizontal direction by a value obtained by dividing the whole resolution of the horizontal direction by a predetermined division number of the horizontal direction and a maximum size of the number of pixels of the elemental fringe pattern, and
expands the resolution for each of the segments in the vertical direction by a value obtained by dividing the whole resolution of the vertical direction by a predetermined division number of the vertical direction and a half value of the maximum size of the number of pixels of the elemental fringe pattern.

20. A hologram generation apparatus, comprising:
a three-dimensional spatial data input unit configured to receive three-dimensional spatial data of a three-dimensional object;
a hologram elemental fringe pattern size calculating unit configured to calculate a maximum size of the elemental fringe pattern and a size of the elemental fringe pattern for each depth for the three-dimensional spatial data;
a hologram plane dividing unit configured to divide entire resolution of a predetermined entire hologram into a plurality of segments based on a predetermined number of divisions of the horizontal direction and a vertical direction and expand resolution for each segment based on a maximum size of the elemental fringe pattern; and
a hologram generating unit configured to determine a segment in which the three-dimensional spatial data of the three-dimensional object propagates a wave field, calculate three-dimensional space data propagating the wave field for each of the segments, calculate the segment unit holograms for each of the segments using a computer-generated hologram generation technique based on three-dimensional spatial data propagating the wave field for each of the segments, and accumulate the overlapping regions between the segments and sum the segment unit holograms to produce the entire hologram for the entire resolution.

* * * * *